Oct. 25, 1932.  S. A. NEIDICH  1,884,131
MANUFACTURE OF TAPERED TUBES OF CELLULOID AND THE LIKE
Original Filed Jan. 18, 1929
FIG. I
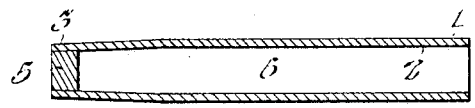
FIG. II.
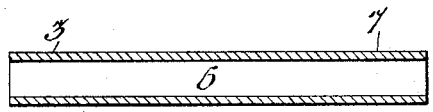
FIG. III.
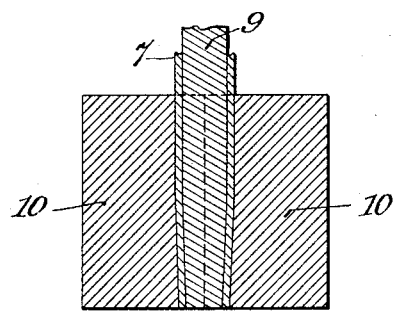
INVENTOR:
SAMUEL A. NEIDICH, Patented Oct. 25, 1932

1,884,131

UNITED STATES PATENT OFFICE

SAMUEL A. NEIDICH, OF EDGEWATER PARK, NEW JERSEY, ASSIGNOR TO SANITE CORPORATION, OF BURLINGTON, NEW JERSEY, A CORPORATION OF NEW JERSEY

MANUFACTURE OF TAPERED TUBES OF CELLULOID AND THE LIKE

Original application filed January 18, 1929, Serial No. 333,353. Divided and this application filed April 17, 1930. Serial No. 444,952.

This is a division of my original application Serial No. 333,353 filed January 18, 1929, for Letters Patent of the United States for improvement in the manufacture of tapered tubes of celluloid and the like.

My invention may be employed with particular advantage in the manufacture of the bodies of fountain pens from celluloid and the like products of cellulose, for instance, cellulose nitrate, cellulose acetate, or any suitable substance. It is the general practice to provide such a body with a screw thread at the end in which the pen point is fitted and to taper the other end so that it may be slip fitted in a removable cap for said body which is provided with an internal screw thread for engagement with the thread on said body; the purpose of the taper being to permit such cap to be slip fitted upon such tapered end of the body without marring the internal screw thread in the cap. It is the ordinary practice to form such bodies from a rod of uniform diameter which is bored cylindrically and then ground off circumferentially at one end to the desired taper, or to form a tube of uniform thickness thruout its length, with a cylindrical bore, and to grind off the outer portion thereof at one end to the desired taper. In either case; the wall of the body is progressively thinner at its tapered portion than at its portion which has not been ground off and, as the strength of the tube is no greater than that of its thinnest portion; the thicker portions represent not only a waste of the material but a waste of space, which might be more economically utilized in the storage of ink. If such tubes be formed of fancy celluloid, the aforesaid waste of material is a highly important factor in the general cost of production of the fountain pens, for such fancy material costs as much as $2.50 per commercial sheet, 20" × 50" and .01" thick.

Therefore, it is the purpose and effect of my invention to avoid the waste of material and space characteristic of the prior art by forming a tube of celluloid and the like, preferably by rolling such a thin sheet upon a mandrel until the tube is of the minimum thickness required and, thereafter, tapering said tube at one end by deforming the tube.

As hereinafter described, my improved tube may be primarily formed of the minimum diameter required and be softened and expanded to the maximum diameter required; being tapered by such expanding operation.

However, I do not desire to limit myself to the initial formation of the tube from a rolled sheet, as my invention may be utilized in the production of tapered tubes from primarily cylindrical tubes regardless of the manner in which the latter are produced. For instance, they may be bored from solid rods, as above contemplated, or be extruded or molded.

My invention includes the various novel features of construction and arrangement hereinafter more definitely specified.

In said drawing; Fig. I is a longitudinal sectional view of a fountain pen tube made in accordance with my invention.

Fig. II is a longitudinal sectional view of a thin tube in accordance with my invention, primarily of the smallest diameter of the body shown in Fig. I.

Fig. III is a sectional view of tube tapering die means, with a section of a fragment of the tube indicated in Fig. II expanded therein to the desired tapered form.

Referring to Fig. I; my improved tube 1 has the wall 2 of uniform thickness thruout its length and of the thickness deemed desirable at the region 3 at the inner end of the plug 5; thus saving a considerable portion of the material and affording a larger ink chamber 6 as compared with the aforesaid tubes of the prior art.

Such fountain pen bodies as indicated in Fig. I may be formed, in accordance with my invention, in any convenient way. For instance, as indicated in Figs. II and III, a tube 7, of the thickness indicated at 3 in Fig. I and of the smallest diameter required for the body shown in that figure, is first formed as a cylinder of uniform diameter thruout its length. As above noted, such a tube is preferably formed by rolling a thin sheet of celluloid or the like with its convolutions moistened with a solvent and in contact so that such convolutions merge and form a wall which is homogenous thruout its length.

Such a solvent may be acetone for said celluloid or nitrate; and ethyl acetate, or a mixture of alcohol and ether, for said cellulose acetate. However, as above noted, such a tube may be formed by drilling a solid rod, or by extruding or molding celluloid or the like in a plastic state.

The tube 7 shown in Fig. II may be softened by heating it, or by subjecting it to the action of a suitable solvent; for instance, if it is celluloid, it may be dipped in a liquid bath including acetone, to the extent of the region thereof which is to be deformed, and, in its softened state, may be expanded over and internal die mandrel 9 upon which it may be permitted to set. If desired, said die means 9 may be used in conjunction with two oppositely counterpart die members 10 either by thrusting said tube axially between said die members 10 when the latter are in the close relation shown or by thrusting said die members toward each other, or by thus relatively moving all three die members. The primarily cylindrical tube 7 being thus deformed to the shape shown at 1 in Fig. I may be permitted to set in such tapered form and is provided with the plug 5 to close the end of the ink chamber 6; the contiguous surfaces of the tube and plug being conveniently softened, as aforesaid, before the insertion of the plug.

Altho I have illustrated my invention with reference to a tube designed to afford a fountain pen ink chamber; it is obvious that tubes such as shown in Fig. I may be used for other purposes either with or without plugged ends.

Therefore, I do not desire to limit myself to the precise details of construction and arrangement herein set forth, as it is obvious that various modifications may be made therein, without departing from the essential features of my invention, as defined in the appended claims.

I claim:

1. A method of making a tapered tube of celluloid and the like which includes primarily forming a cylindrical tube of uniform diameter thruout its length; softening said tube; and deforming said tube to tapered form while in the softened state, by expanding it, in a conical tubular space confined between inner and outer inelastic conical walls.

2. The method of making a tapered tube of celluloid and the like, which includes; moistening a sheet of such material with a solvent thereof; rolling such sheet to cylindrical tubular form; distorting a portion of the cylindrical wall of said tube to conical form, by expanding it, in a conical tubular space confined between inner and outer inelastic conical walls, while it is in a softened state; and maintaining the tube in such distorted form until it hardens.

3. The method of making a tapered tube of celluloid and the like, which includes primarily forming a cylindrical tube of substantially uniform diameter and thickness thruout its length; and distorting a portion of the cylindrical wall of said tube to conical form, by expanding it, in a conical tubular space confined between inner and outer inelastic conical walls, while it is in a softened state, and while retaining all of the material in said wall.

In testimony whereof, I have hereunto signed my name at Burlington, New Jersey, this 19th day of December, 1929.

SAMUEL A. NEIDICH.